No. 771,765. PATENTED OCT. 4, 1904.
T. M. BROWN.
APPARATUS FOR CANNING AND COOKING GOODS.
APPLICATION FILED MAR. 14, 1904.
NO MODEL.
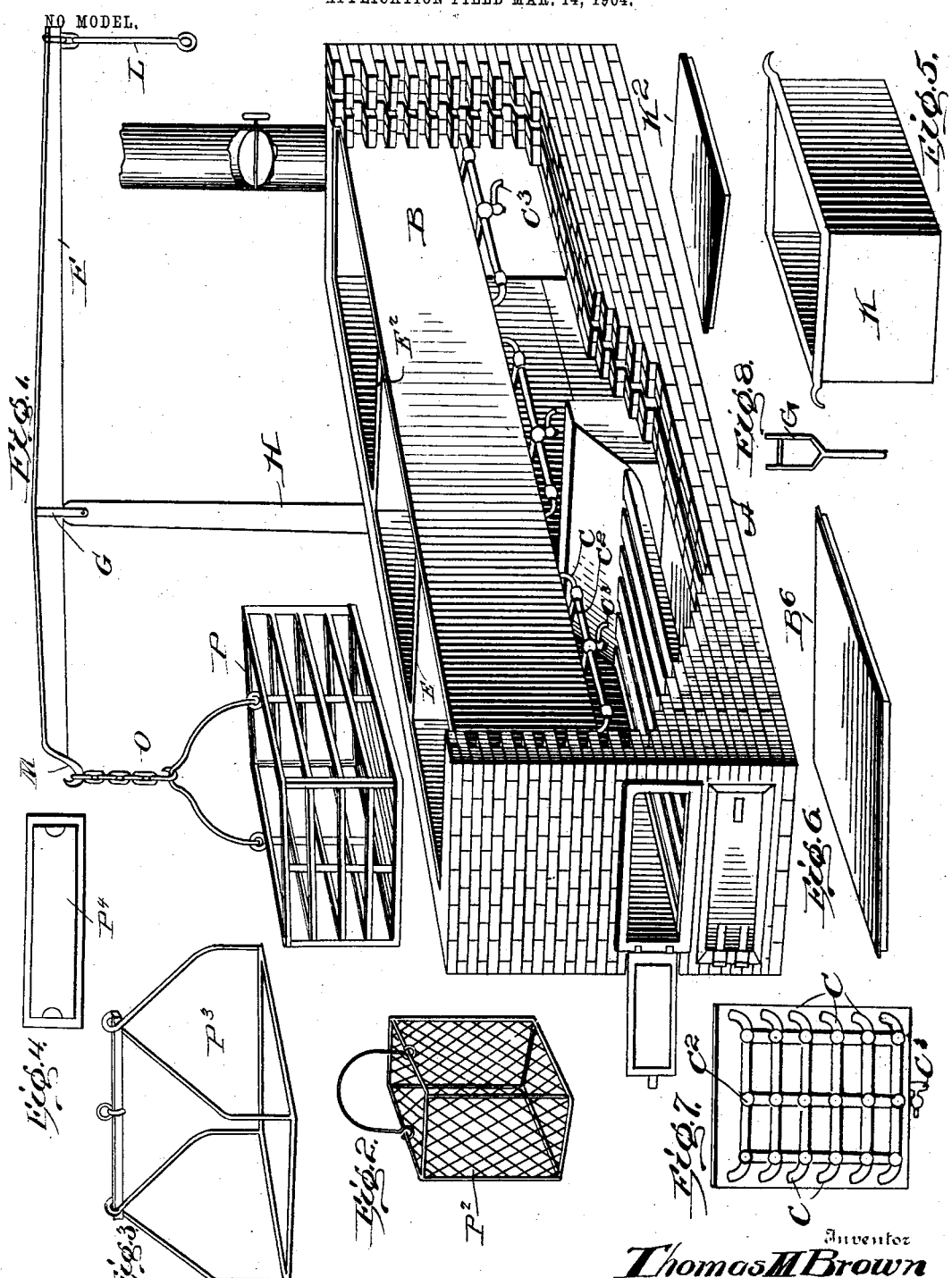
Witnesses
P. M. Fowler Jr.
Henderson F. Hill
Inventor
Thomas M Brown
By
S. A. Haseltine
Attorney No. 771,765. Patented October 4, 1904.

UNITED STATES PATENT OFFICE.

THOMAS M. BROWN, OF SPRINGFIELD, MISSOURI.

APPARATUS FOR CANNING AND COOKING GOODS.

SPECIFICATION forming part of Letters Patent No. 771,765, dated October 4, 1904.

Application filed March 14, 1904. Serial No. 198,179. (No model.)

*To all whom it may concern:*

Be it known that I, THOMAS M. BROWN, a citizen of the United States, residing at Springfield, in the county of Greene and State of Missouri, have invented new and useful Improvements in Apparatus for Canning and Cooking Goods, of which the following is a specification.

My invention relates to improvements in canning and preserving machines, the object of which is to provide a cheap, simple, durable, and economical device for quickly and economically heating the articles to be canned or preserved.

These objects I attain by means of a device illustrated in the accompanying drawings, forming a part of this specification, in which—

Figure 1 is a view in elevation, partly cut away, showing the entire device. Fig. 2 is a detail view showing a basket. Fig. 3 is a detail view showing a lifting-frame. Fig. 4 is a detail view showing one of the trays. Fig. 5 is a detail view showing one of the cooking-receptacles. Fig. 6 shows a cover for one of the compartments of the heating-tank. Fig. 7 is a detail view showing the bottom of one compartment of the tank with its system of pipes. Fig. 8 is a detail view showing the swivel-yoke.

Similar letters of reference indicate corresponding parts of the several figures.

A is an ordinary furnace made any desired size and shape, preferably made of brick and rectangular and long enough to receive a tank having a number of compartments.

B is a compartment tank or heating-boilers connected, any desired size and shape, having compartments for the purpose of economizing heat and for utility in handling the material to be operated upon. These compartments are made water-tight and separated from each other by walls E E² and are to be well filled with water in which the scalding, exhausting, processing, and cooking of all products operated upon is done. Beneath each of the compartments is a separate system of heating-tubes C and cross-tubes C². (Illustrated in Fig. 7.) Any number of tubes passing in any desired direction may be used. The heat from the furnace coming in direct contact with all the surfaces of these tubes heats the water and generates steam, which heats the contents of the tank above which they are connected. The contents of the tubes may be drawn off by means of a faucet C³, which extends on the outside of the furnace.

In preparing a furnace for the compartment-tank the same is so arranged as to bring the heat in direct contact with the pipes above as described and the bottom of the tank at the same time, so as to economize heat and fuel, and this is one of the important features of my invention. Another important feature is making a tank with separate compartments adjoining each other, so that each imparts heat to the others. Another important feature of this compartment-tank is the utility or labor-saving mechanism or construction which it affords.

The compartments being separated only by partition-walls E and E², which are preferably made of metal, will easily transmit heat from one compartment to the others and assist in keeping a uniform temperature in all of them. The single tank having compartment adjoining each other makes it easier in handling or placing the material from one compartment to another. I employ for this purpose a lever F, supported in a yoke G, pivoted to the top of a post H. One end of said lever may be provided with a rope or handle L, while the other end is provided with a suitable hook M and chain O for handling the goods, which are preferably placed in baskets P, racks, frames, or crates, as illustrated in Figs. 1, 2, 3, and 4. Metallic cookers K, having a top for the same, K², as shown in Fig. 5, may be provided in either or all of the compartments of the tank. Each cooker K fits tightly over the compartment by means of a flange on the upper edge of the cooker, which extends out on all sides to support the cooker on the upper edge of the compartments of the tank, forming a top or cover for said compartments, in which it is placed, forming also a space for the air, water, and steam to pass around on all sides and the bottom of said cookers. One of the cookers may be provided for each of the compartments. The compartments may be provided with a suitable cover B⁶, which is made to fit closely into the compartment, where it may be locked by any ordinary or suitable means.

My invention is used thus: In canning fruits, vegetables, &c., I place the materials to be scalded in the baskets P. The said baskets are constructed differently, as shown in the several figures for the different stages of the process in canning. The materials that are to be scalded are placed in the open basket P² and immersed in the scalding water of one of the compartments, and after being scalded and prepared for the next process they are placed in cans, and the cans are placed in the trays P⁴ and set in the exhaust-crate P³. They are then handled by the hoisting device and are placed in one of the compartments for heating to drive out the air or exhausting. This accomplished, they are hermetically sealed, and the cans thus sealed air-tight are placed in the crate P and by means of the hoisting device are lowered into one of the compartments to be cooked or processed. The three compartments permit of the placing the goods from one compartment to another, so as not to use the scalding water to do the exhausting or processing. Articles that do not require scalding go through part of the above process, and articles to be manufactured into jellies, jams, preserves, butters, syrups, catsups, hominies, &c., are prepared and placed in the cookers K, which are placed as described in one of the compartments with the cover placed in position, as stated, and cooked without danger of scorching.

The device as thus constructed is cheap, simple, and useful for farms or for a small operator.

What I claim is—

The combination of a furnace, a tank situated within said furnace and provided with a plurality of compartments, water-heating tubes communicating with each compartment and extending into said furnace, and cookers provided with flanges, suspended within said compartments.

In testimony whereof I have signed my name to this specification in the presence of two subscribing witnesses.

THOMAS M. BROWN.

Witnesses:
ROSCOE PATTERSON,
GEO. SIMS.